3,464,486
CONFIGURATION OF SEALED HEAT STORAGE MODULES

Richard E. Rice, Arlington, and William E. Whitney, Belmont, Mass., assignors, by mesne assignments, to Hooker Chemical Corporation, Niagara Falls, N.Y., a corporation of New York
Filed Sept. 19, 1967, Ser. No. 668,785
Int. Cl. F24h 7/04, 3/04; F28f 3/00
U.S. Cl. 165—1
11 Claims

ABSTRACT OF THE DISCLOSURE

Several sealed modules containing a heat storage material comprising an alkali metal hydroxide composition are placed in an insulated chamber having an inlet and an outlet, ducts disposed within the insulated chamber to conduct a fluid to be heated either into an internal chamber housing the modules or straight through the chamber to the outlet. Heating means are disposed between the sealed modules or within the sealed modules. A valve means is situated in the straight through duct is responsive to a temperature sensing device placed in the outlet to regulate the amount of fluid passing into contact with the modules, which regulation results in a controlled temperature of the fluid drawn through the chamber housing.

BACKGROUND OF THE INVENTION

Heat storage materials which operate on the heat of fusion principle, comprising alkali metal compositions, pose unusual problems of container or module construction because of their extremely high heat storage capacity in comparison with storage materials functioning upon the heat of crystallization principle. Alkali metal hydroxide compositions for heat storage are most economically held in containers formed from ordinary mild steel.

One major problem involved in storing alkali metal hydroxide compositions in mild steel containers results from the substantially greater thermal expansion coefficients of the heat storage material when compared to the expansion coefficient of the steel container. Another problem results from the tendency of the alkali metal hydroxide composition to corrode the inside walls of a steel container.

These problems have been overcome by providing, within the steel container, a clearance space in communication with ambient air into which the liquid alkali metal hydroxide composition may expand without exerting undesirable pressure on the steel container walls. Also, communication with air has been essential to maintain a non-corrosive condition within the steel container.

The corrosion of the internal surfaces of the steel container walls has been reduced to acceptable levels by treatment of the alkali metal hydroxide compositions with hydrogen or dry air to drive off all traces of water and/or by pre-treatment of the alkali metal hydroxide compositions with iron powder to consume the last vestiges of water within the composition. With the discovery of how to reduce the internal corrosion of the steel container walls, the construction of sealed heat storage modules was made possible.

Sealed heat storage modules in which the heat storage material—an alkali metal hydroxide composition—is contained in a steel module with sufficient length of container life based upon the treatment of the heat storage material discussed in the preceding paragraph, are outstanding because of their high heat capacities, low maintenance requirements and long life. These characteristics of the sealed heat storage modules containing alkali metal hydroxide heat storage material make them ideally suited for industrial and home heating applications.

The housing of a plurality of sealed heat storage modules within an insulated chamber has been previously accomplished with cylindrical tubular members containing heat storage material of low heat capacity. Telkes, in U.S. 2,677,243, issued May 4, 1954, discloses in FIGURES 1 and 3, heat storage compositions charged into sealed cylindrical tubular members disposed within an air chamber which is insulated. An air inlet is provided in which the flow of air is directed by dampers either around the heat storage containers or through a by-pass duct. The heated air is then supplied to the area to be heated. The exit duct contains a fan which causes the air to flow through the chamber. The damper arrangement of Telkes provides for air flow either completely around the heat storage containers or completely through a by-pass duct. The heat storage material employed by Telkes is of low heat capacity, based upon the heat of crystallization of a salt at a temperature acceptable for the gradual increase of the room temperature of a home; i.e., 90–96 degrees Fahrenheit. Telkes does not heat the heat storage material with electrical heaters, but relies on heated air to raise the temperature of the heat storage salts to above their melting point.

It is an object of this invention to provide a heat storage unit assembly comprising an insulated housing chamber for more than one sealed cylindrical heat storage module containing an alkali metal hydroxide heat storage composition of high heat storage capacity.

It is another object of this invention to provide a regulating means to moderate the temperature of the fluid passing into the chamber containing the heat storage modules, thereby preventing the delivery of too much heat to a desired area.

A further object of this invention is to provide electrical heating elements for direct heating of several heat storage modules contained within a single insulated housing chamber and for direct rapid heating of fluid.

Other objects of this invention will become apparent to those skilled in this art upon reading the following examples and the detailed description of the preferred embodiment of this invention.

BRIEF SUMMARY OF THE INVENTION

It has been discovered that several cylindrical modules containing an alkali metal hydroxide heat storage composition may be employed effectively to heat fluids such as air. The modules are arranged in spaced rows within an insulated chamber in to which the fluid to be heated passes via a dog-leg duct. The fluid to be heated is brought to the top of the chamber by means of a baffle and it flows down between and over the surfaces of the heated modules to a dog-leg exit duct. Electrical heaters are placed within the cylindrical modules containing an alkali metal hydroxide heat storage composition, or preferably, external to the sealed modules in such position that one heating elemtn will provide heat for four sealed modules. A sump is provided at the bottom of the chamber housing the sealed modules of heat storage material which is sufficiently large to contain the contents of one or two of the modules in case of leakage.

The insulated chamber housing the sealed cylindrical heat storage modules forms part of a larger insulated housing unit which contains a passageway for fluid leading from the inlet directly through the housing to the outlet. Within this passageway, a valve means is located which effectively controls, the amount of fluid passing into the internal chamber housing the heat storage modules, and the amount of fluid flowing straight through the apparatus.

The position of the valve means is controlled by a temperature sensing device located in the path of the fluid exiting the apparatus. A blower located in the outlet of the straight through passageway serves to draw fluid into the apparatus and deliver it to the site to be heated. A mixing action of hot fluid leaving the internal chamber housing the heat storage modules with the unheated fluid passing straight through the apparatus occurs in the straight through passageway ahead of the blower. This mixing of fluids may be enhanced by a flange on the internal wall of the insulated chamber at the point where the heated fluid leaves the dog-leg outlet duct from the inner chamber housing the heat storage modules.

Dog-leg ducts leading into and from the inner chamber housing the heat storage modules serves as effective obstructions to the downward radiation of heat during periods when heat is not being drawn from the apparatus.

The presence of electrical heating elements external to the containers of heat storage material is especially preferred because a fluid, such as air, may be directly and rapidly heated and supplied to the area requiring heat during periods when the heat storage containers do not contain an optimum amount of heat. Slower heating of the fluid may be accomplished by relying solely on the heat stored in the modules. Hence, vary rapid heat delivery or more gradual heat delivery may be accomplished with the same apparatus and, the heating elements supply heat to the modules during periods of off-peak power to effectively introduce heat at the cheapest cost to several heat storage modules.

DETAILED DESCRIPTION OF THE INVENTION

The invention will be more readily understood by reference to the drawing, examples and descriptions that follow. In the drawing.

Figure 1:
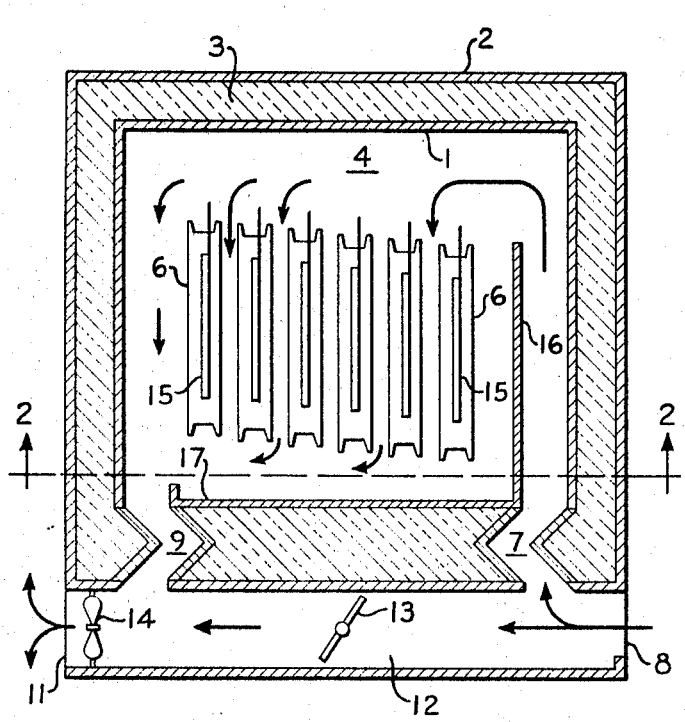
FIG. 1 is a sectional elevation of a heat storage module housing assembly.
Figure 2:
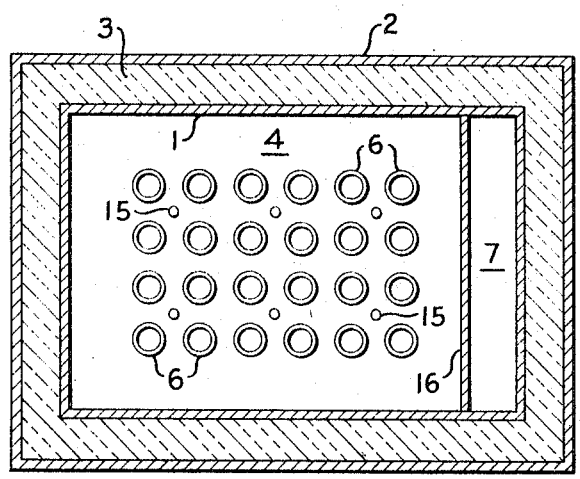
FIG. 2 is a view of another unitary heat storage module assembly taken along a plane as 2—2 of FIG. 1.

FIGS. 1 and 2 illustrate an application of the use of heat storing containers. This apparatus comprises inner and outer walls 1 and 2 with a space therebetween filled with insulation 3. Inside the housing is a chamber 4 containing sealed cylindrical heat-storage units 6 filled with a heat storage material. A dog-leg duct 7 leads to the top of the inner chamber over baffle 16 to a dog-leg duct 9 into outlet 11 which may lead to a space to be heated. Leading from the inlet 8 to the outlet 11 is a by-pass duct 12. At the inlet is a valve means 13 to control the proportion of heated and unheated air delivered to the outlet 11. A blower 14 in the outlet produces circulation of fluid (air) through the apparatus. Heating elements 15 are disposed either internally to the heat storage modules as depicted in FIG. 1 or preferably external to the heat storage modules as depicted in FIG. 2. In the latter case, the direct heating of the fluid may be accomplished very rapidly. Slower heating of the air may be accomplished by relying solely upon the heat retained by the heat storage modules. A combination or variation upon the withdrawal of heat from either the heating elements external to the heat storage modules or the modules themselves, will allow the unitary assembly of the invention to utilize off-peak power supplies most advantageously. A sump 17 is provided at the bottom of the inner chamber 4 to contain any leakage of heat storage material from the modules 6.

Figure 3:
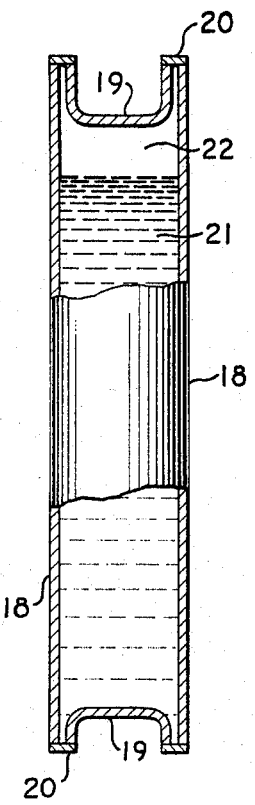
FIG. 3 represents one sealed cylindrical heat storage unit.

FIG. 3 represents a sealed heat storage module. A steel shell 18 and two end closures 19 are sealed as by welding at 20. Heat storage medium 21 is an alkali metal hydroxide composition free of water having been pretreated with some iron powder, in a preferred embodiment. Gas 22 is hydrogen, which at operating conditions, including temperatures from slightly above room temperature to 1,200 degrees Fahrenheit (generally about 900 degrees Fahrenheit is the workable heat storage region of greatest applicability) will pass through the steel wall 18.

Example 1

For the purpose of illustrating the operation of the apparatus assembly depicted in FIGS. 1 and 2, the hot air heating of a home is representative of a typical application. When the temperature within the home drops to an uncomfortable level, a thermostatically actuated electrical circuit (not shown) causes fan 14 to pull air into the inlet 8. Valve 13 is positioned in response to a temperature measuring device situated in outlet 11, in the room to be heated or by the thermostat which activates blower 14. The position of valve 13 determines the volume of air which passes into contact with the hot heat storage modules 6. That portion of the air directed into contact with the heated modules, circulates between and around the modules, picking up heat through conduction. The air travels from the internal heat storage module chamber 4 into the straight through duct 12 where it mixes with the cooler air which bypassed valve 13. Blower fan 14 delivers the heated air through ducts to the room being heated. When the temperature of the room reaches the desirable point, the thermostat opens the circuit which actuated blower 14.

Example 2

In the operation of a heat storage assembly as depicted in FIG. 2, where electrical heating elements are not situated within the sealed modules, heat may be drawn from the assembly by blower fan 14 by direct heating of air with the heating elements. During a period when the heat storage in the modules is at a low, heat may still be supplied to the home without delay attending the initial heating period necessary to heat the storage material within the modules. During a period in which the heat storage modules are operating with acceptable quantities of stored heat, the heating elements 15 may be turned off and heat may be drawn from the heated modules. Hence, the optimum utilization of off-peak electricity for supplying heat to the modules is available without losing the heat delivery capability of the assembly during periods when the heat stored in the modules has been largely exhausted.

Having disclosed the invention, obvious modifications will be apparent to those skilled in the art which do not depart from the true nature and scope of this contribution. The disclosure of specific preferred embodiments of this invention are for purposes of illustration only and are not intended to present a limitation on the scope of this invention.

What is claimed is:

1. An apparatus for heating a fluid comprising inner and outer walls with a space therebetween containing insulation, an internal chamber defined by said inner walls, an inlet duct and an outlet duct communicating with said internal chamber, a bypass passage communicating with and bypassing said inlet and outlet ducts, said passage having an external inlet and outlet, plural sealed tubular heat storage units containing a substantially anhydrous alkali metal hydroxide heat storage composition disposed in spaced relationship in said internal chamber, plural heating elements associated with said heat storage units, means in said bypass passage for distributing entering fluid into said inlet duct and said bypass passage, and means for moving said fluid through said apparatus.

2. The apparatus of claim 1 in which said heat storage composition is in liquid state during at least a portion of a thermal cycle.

3. The apparatus of claim 1 in which the bottom of said walls form a sump of sufficient capacity to retain the liquid contents of at least one heat storage unit.

4. The apparatus of claim 1 in which said inlet and said outlet ducts open into the bottom of said internal chamber.

5. The apparatus of claim 1 in which the heating elements are disposed within the individual heat storage units.

6. The apparatus of claim 1 in which the heating elements are disposed in the regions external to the sealed heat storage units.

7. The apparatus of claim 1 wherein the inlet and outlet ducts are of dog-leg shape.

8. A process for supplying heat to a desired area which comprises drawing a fluid by means of a blower, through a dog-leg duct into an insulated chamber wherein the fluid passes into intimate contact with sealed cylindrical heat storage modules containing alkali metal hydroxide heat storage composition and electrical heating elements, out a dog-leg duct where the heated fluid is mixed with cooler fluid, and delivering the thusly heated fluid to said area.

9. The process of claim 8 in which the fluid is air.

10. The process of claim 9 in which the air is heated primarily by the heating elements disposed external to the heat storage modules.

11. The process of claim 9 in which the air is heated primarily by the heat storage modules.

References Cited

UNITED STATES PATENTS

| | | | |
|---|---|---|---|
| 2,677,243 | 5/1954 | Telkes | 165—18 |
| 3,141,454 | 7/1964 | Laing | 126—400 |
| 3,283,125 | 11/1966 | Snelling | 165—18 |
| 3,103,934 | 9/1963 | Sabourin | 126—400 |

ROBERT A. O'LEARY, Primary Examiner

C. SUKALO, Assistant Examiner

U.S. Cl. X.R.

126—400; 165—103; 219—378